Aug. 11, 1970   E. M. PURCELL ET AL   3,523,610

PARTICLE SEPARATOR

Filed Dec. 1, 1966   2 Sheets-Sheet 1

INVENTORS
EDWARD M. PURCELL
HOWARD C. BERG

BY
Cooch & O'Connell
ATTORNEYS

INVENTORS
EDWARD M. PURCELL
HOWARD C. BERG

BY

*Cooch & O'Connell*

ATTORNEYS

United States Patent Office 3,523,610
Patented Aug. 11, 1970

3,523,610
PARTICLE SEPARATOR
Edward M. Purcell, 5 Wright St., and Howard C. Berg,
182 Appleton St., both of Cambridge, Mass. 02138
Filed Dec. 1, 1966, Ser. No. 598,321
Int. Cl. B03b 3/00
U.S. Cl. 209—155                                    11 Claims

ABSTRACT OF THE DISCLOSURE

An apparatus and method for separating particles in accordance with their effective masses in which particles are allowed to diffuse within a layer of a viscous liquid medium which can be caused to flow and which is subject to an acceleration transverse to the direction of flow and to the surfaces of the layer. The particles are introduced into the liquid as a group near one end of the layer and are allowed to diffuse under conditions of zero flow until they form equilibrium Boltzmann distributions within the liquid near one of its surfaces in accordance with their effective masses, the magnitude of the transverse acceleration, the temperature of the liquid, and the thickness (height) of the liquid medium. Then the liquid is caused to flow at a rate sufficiently small that a non-turbulent variable velocity profile is established across the layer in the direction of the transverse acceleration and also sufficiently small that the particles can diffuse many times across their Boltzmann distribution in the period of flow. Particles with the same effective mass then have substantially the same average velocity in the direction of flow. This velocity is different for particles of different effective masses, so that such particles tend to form separate groups within the liquid along the direction of flow. Suitable means can be used to collect different portions of the liquid which contain these separate groups.

---

This invention relates generally to particle separators and more particularly to methods and devices for separating particles in accordance with their masses.

Previously known systems for separating particles have utilized methods and devices for providing separation in accordance with the specific gravities of the particles involved, utilizing various "float-sink" systems, or in accordance with particle sizes or particle configurations, utilizing sieves or devices which distinguish sedimentation rates. In addition, certain methods used in the field of chromatography, for example, have achieved separation of particles in accordance with their chemical affinities. However, no presently known methods have successfully utilized a system for providing separation in accordance with mass.

This invention is particularly suitable for separating very small particles, such as molecules, which are subject to random motions. In the invention a mixture of such particles is introduced into a field, such as an aqueous liquid, which is thereupon caused to flow at a relatively low average velocity in a linear direction. As a result of such flow a variable velocity profile of the liquid exists in a direction transverse to its linear direction of flow. If a sufficiently long time period of flow is utilized (that is, if the rate of flow is very small), the effects of the random motion of individual particles within the liquid statistically average out and particles having the same effective mass within the liquid tend to travel at substantially the same average velocity in the linear direction of flow. Effective mass is herein defined as the mass of a particle less the mass of the fluid which such particle displaces. Thus, the particles tend to separate out into groups, or bands, of particles along the direction of fluid flow in accordance with their effective mass.

The operation of the invention can be described more clearly with the aid of the accompanying drawings in which.

Figure 1:
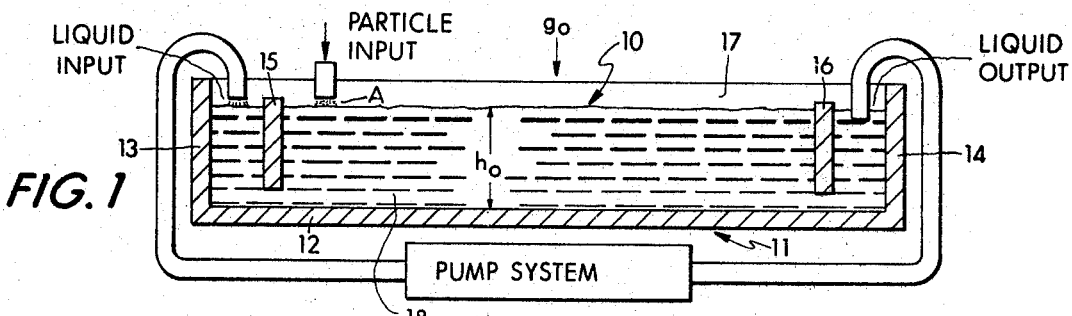
FIG. 1 shows a cross-sectional view of one particular embodiment of the invention for separating particles having relatively large effective masses.
Figure 2A:
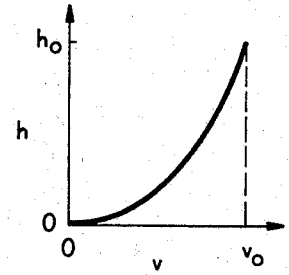
FIGS. 2A and 2B show representations of the variable velocity profile of the moving fluid medium, as used in the embodiment of FIG. 1.
Figure 2B:
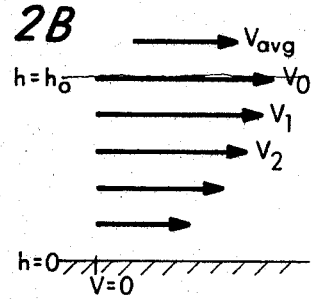
Figure 3A:
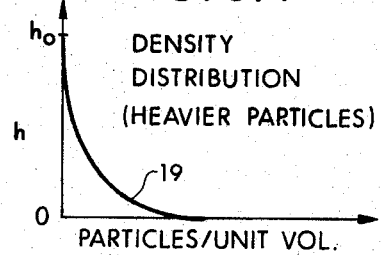
FIGS. 3A and 3B show graphs of the density distribution of particles within such medium.
Figure 3B:
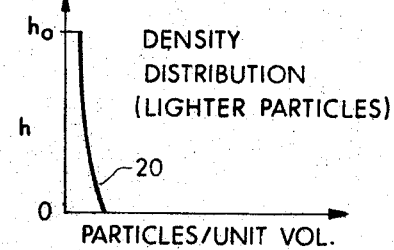

The theory of operation of this invention can be readily understood and described with reference to the particular embodiment discussed in FIGS. 1–4. In FIG. 1 there is shown a channel 10 formed by an appropriate trough, or box-like, structure 11 having a bottom wall 12, end walls 13 and 14 and side walls 17 (only one of which is shown in FIG. 1). A pair of barriers, or baffles, 15 and 16 are mounted within channel 10 between side walls 17, being attached to and extending therebetween. Barrier 15 is positioned near end wall 13 and barrier 16 is positioned near end wall 14 as shown. A liquid 18, such as water, or other aqueous solution, is introduced at the left-hand end of channel 10 between end wall 13 and barrier 15 until channel 10 is filled to a suitable level, indicated in the figure as $h_0$ measured from the upper surface of bottom wall 12 to the free surface of the liquid. If liquid 18 is caused to flow at a very low average velocity, $V_{avg}$, from the left-hand end to the right-hand end of channel 10, such flow being characterized by a low Reynold's number (i.e., a viscous flow) a variable velocity profile for the flowing medium will be established in the transverse direction such that a maximum velocity $V_0$ exists at the free surface of the liquid (where $h=h_0$) and progressively lower velocities (e.g., velocities $V_1$, $V_2$, etc.) exist in the direction toward the bottom of the channel. The velocity of the flowing medium is zero at the bottom surface of the channel (where $h=0$). Such a velocity distribution is shown in the representations of FIGS. 2A and 2B. Because of the relatively low average velocity involved, essentially no turbulence effects arise for consideration. The bottom surface of the barriers 15 and 16 must be parallel to the upper surface of the bottom wall 12 so that the velocity profile is substantially constant from side wall to side wall.

A material containing a mixture of particles which are to be separated is introduced approximately at point A to the right of barrier 15 at the left-hand end of channel 10. When the material is so introduced, the liquid is not moving, so that no linear flow exists along the channel. The channel is mounted in a horizontal plane so that the material (and the liquid) is subject to an acceleration $g_0$ due to gravity in the downward direction as shown by the arrow. After an appropriate period of time the particles settle out within the liquid in a specific variable density pattern. The variation in particle density (that is, in the number of particles per unit volume) in the vertical direction within the liquid is given by Boltzmann's Law. Each set of particles of effective mass $m'$ has a density distribution of the form $$\frac{n_{(h)}}{n_{(0)}} = e^{-m'gh/kT} \quad (1)$$

where $n_{(h)}$ is the number of particles per unit volume at height $h$, $n_{(0)}$ is the number of particles per unit volume at height 0, i.e., at the bottom of the channel in which the liquid resides, $g$ is the transverse acceleration ($g_0$, in the particular case under consideration), $h$ is the height, $T$ is the absolute temperature, and $k$ is Boltzmann's constant. As shown in the typical density profiles 19 and 20 depicted in FIGS. 3A and 3B, respectively, more particles are to be found nearer the bottom of the channel than nearer the top. The distribution curve for particles of heavier effective mass (FIG. 3A) differs from the distribution curve for particles of lighter effective mass (FIG. 3B), in that the heavier particles are relatively more concentrated near the bottom.

After the particles have settled as described above, the liquid is caused to flow at a very low linear velocity from left to right as in FIG. 1. This flow does not effect the overall vertical density distribution. Individual particles, however, are constantly moving about within the liquid in a random fashion due to Brownian motion. Thus, the position of any individual particle within the liquid (effffectively, the height level of the particle) varies randomly with time. Since the moving liquid has a variable transverse velocity profile as a function of height, as shown in FIGS. 2A and 2B, an individual particle moves from left to right in channel 10 at varying velocities as it occupies different random positions within the liquid. A representative graph of the instantaneous velocity, $v$, of an individual particle (for example, from the distribution 3A) as a function of time would be exemplified by the random function shown by the solid line 21 in FIG. 4A. Another individual particle having the same effective mass also has a random motion which produces a random velocity pattern which may be represented, for example, by the dashed line 22 of FIG. 4A. A different random velocity curve exists for each of the individual particles within the material. Each of these random velocity functions has a particular average value over a specified period of time. The average velocity of any one particle is substantially the same as that of any other particle having the same effective mass provided that the period of time over which the velocity is averaged is sufficiently long compared to the diffusion time, that is, the time required for the particle to diffuse from the bottom to the top of the vertical density profile. The diffusion time, $t_D$, is a function of the scale height of the density profile $h_s$, where $$h_s = \frac{kT}{m'g} \quad (2)$$

and of the diffusion constant, $D$, of the particle in the liquid. The diffusion time, $t_D$, can be expressed as $$t_D = \frac{h_s^2}{2D} \quad (3)$$

If the flow time, $t_F$, is made sufficiently long in comparison to the diffusion time, $t_D$, all of the particles having the same effective mass will tend to have substantially the same average velocity. This velocity is shown as $v_{avg}$ in FIG. 4A.

Figure 4A:
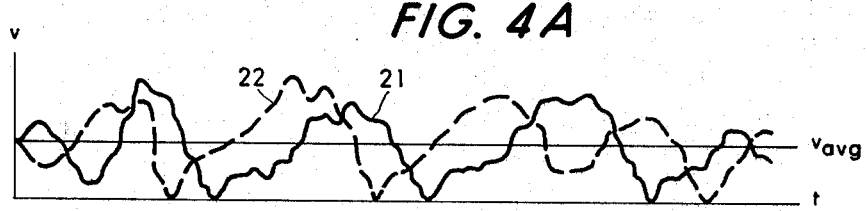
FIGS. 4A and 4B show graphical representations of the instantaneous velocities as a function of time of representative individual particles within the fluid medium.
Figure 4B:
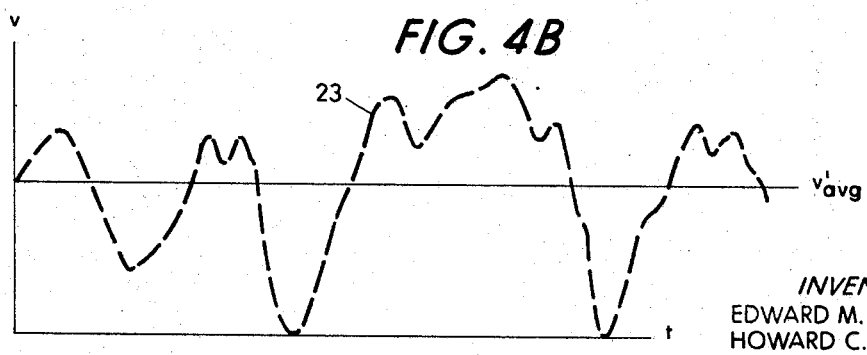

Lighter particles (for example, from the distribution profile of FIG. 3B) will have random velocity patterns of the kind exemplified by the dashed line 23 of FIG. 4B. The lighter particles spend more time on the average on the regions of higher velocity, so in this case the random velocity of an individual particle will have an average value, $v'_{avg}$, over a long period of time which is greater than average velocity, $v_{avg}$, of the particles of FIG. 4A, which are of greater effective mass. In the manner discussed above, all particles having that same effective mass will, over the time period $t_F$, have substantially the same average velocity, provided $t_F$ is sufficiently long compared to $t_D$, the diffusion time for the lighter particles.

Thus, if a material containing a mixture of particles having different effective masses is introduced into the liquid, bands or groups of particles having the same average velocity tend to form at different positions along the liquid. Particles having a lower effective mass tend to move at a faster average velocity and, therefore, to reach the right-hand or output end of channel 10 at a point in time earlier than particles having a greater effective mass, which move at slower average velocities. Hence, a separation of the particles in accordance with effective masses occurs.

Figure 8:
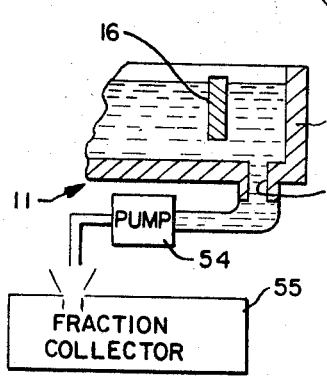
FIG. 8 shows a cross-sectional view of a portion of the structure of FIG. 1 depicting a means for removing separate portions of the liquid from such structure.

Separate portions of the liquid containing separate groups of particles, may then be removed at the output end of channel 10 in various ways. For example, each separate portion may be removed manually with an eye dropper, or similar means, and placed in a separate collecting container or a well-known fraction collection system may be utilized as shown in FIG. 8. In the latter case, an opening 53 is provided at the output end of the trough structure 11, which opening is suitably connected to a pump 54 which transfers the liquid output to a conventional fraction collector 55 so that liquid samples leaving the structure at different times are collected in different fractions. In this embodiment the pump system and the liquid input tube shown in FIG. 1 are used to add pure liquid to the trough at the same rate at which it is transferred to the fraction collector.

The degree of separation, that is the ability to form readily recognizable discrete groups of particles, will depend on the values selected for $t_F$ relative to $t_D$. More specifically, the ratio of the width of a band to the mean distance it travels in the time $t_F$ is approximately equal to $\sqrt{t_D/t_F}$. Two species of particles which differ in effective mass by $x\%$ will be effectively separated provided $\sqrt{t_D/t_F}$ is approximately $x/100$ or less.

As illustrated in the curves of FIGS. 4A and 4B, an individual particle will find itself at the bottom of channel 10 (i.e., at $h=0$) at various times during the course of its migration from left to right in the liquid medium. Depending on the chemical structure of the materials involved, the attraction between the particle and the bottom wall 12 of channel 10 may be sufficient to cause the particle to adhere to this wall and to remain there for a time long compared to $t_D$. To avoid such a situation it is necessary to select for the surface of the bottom wall a material to which the particles will not be adsorbed.

In practice, the transverse velocity profile of the liquid, the acceleration $g$, the flow time $t_F$, and the absolute temperature $T$ are known, so that the average velocity of the particles can be computed as a function of $m'$. The displacement of the center of mass of each group of particles in time $t_F$ is, therefore, a measure of $m'$. Thus the method of operation of the invention not only separates particles in accordance with their effective masses, it also provides a measurement of each separate value of $m'$.

Figure 5:
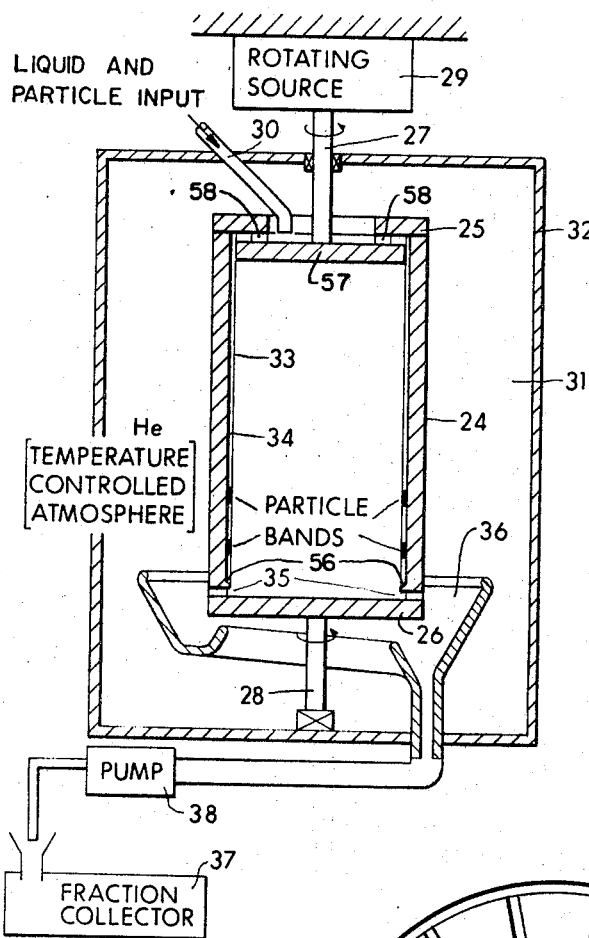
FIG. 5 shows a cross-sectional view of an alternative embodiment of the invention particularly useful for separating particles of relatively small effective masses.

Although the particular embodiment discussed with reference to FIG. 1 is useful in separating many types of particles, particularly those having effective masses in the order of magnitude of $10^{-14}$ grams or greater, it may not be particularly applicable for separating particles having effective masses generally less than that. In the configuration of FIG. 1 the acceleration in the direction transverse to the linear direction of fluid flow is equal to $g_0$, the acceleration due to gravity (approximately 980 cm./sec.$^2$). For relatively light particles with $g=g_0$ the scale height $h_s$, Eq. 2, and the diffusion time $t_D$, Eq. 3, may be inordinately large, so that separations cannot be effected except over enormous periods of time. In order to assure a practical operating device, both $h_s$ and $t_D$ should have reasonably small values, and this can be achieved by providing an embodiment utilizing relatively large transverse accelerations (large $g$). For this purpose, an alternative embodiment such as shown in FIG. 5 may be used. The embodiment of FIG. 5 can be envisioned as an alternative representation of the trough, or channel, shown in FIG. 1 wherein an equivalent channel is formed by a cylindrical centrifuge system in which the acceleration transverse to the channel is extremely large, for example, in the order of magnitude of many thousands of times the acceleration due to gravity, $g_0$. FIG. 5 shows a simplified diagrammatic form of such a centrifuge device.

As shown in FIG. 5, the centrifuge comprises a cylinder 24 having appropriate caps 25 and 26 at either end, which cylinder rotates about its central axis between fixed points suspended on flexible rotating shafts 27 and 28. A cylindrical disc 57 is attached to rotating shaft 27 and to cylinder 24 by means of pins 58. A rotating source 29 causes cylinder 24 to rotate at sufficient speeds (12,000 revolutions per minute, for example) to provide large accelerations (4,000 $g_0$ or more, for example) in a direction transverse to the axis of rotation of the cylinder. The cylinder may be constructed of aluminum, stainless steel or other suitable material and may be enclosed in a temperature controlled helium atmosphere 31 within a suitable case 32. An opening, or input tube, 30 at the top of cylinder 24 is used to insert the liquid. When liquid is introduced into the centrifuge it forms a thin film 33 on the inner surface 34 of the cylinder wall. The ultimate thickness of this film is limited by the height of the cylindrical barrier 56 at the exit orifice 35 (approximately 1 mm.).

In a typical experiment, enough particle-free liquid (for example, an aqueous buffer) is added through tube 30 to form a film of the thickness of the barrier height. Next a sample of liquid containing a mixture of particles to be separated is added through tube 30. The sample may be, for example, aqueous buffer containing a mixture of proteins having different effective masses, which proteins are to be separated by the invention. The particles settle within the liquid film 33 until they are distributed therein in accordance with Boltzmann's distribution law, Eq. 1, where now the height $h$ is measured from the inner surface of the cylinder 34 in a direction perpendicular to the free surface of the liquid. These density distribution patterns form within the liquid near the upper end of the cylinder. If additional particle-free aqueous buffer is then added through tube 30 at a constant rate, the liquid medium flows down the cylinder in a direction parallel to the axis of rotation, and bands of particles separate out in accordance with their effective masses in a manner similar to that described with reference to FIG. 1. The flow rate of the liquid down the cylinder wall from the top of the device to the bottom thereof is very low, e.g., in the order of a few centimeters per hour and, consequently, $t_F$ is relatively long. The aqueous medium, for the particular embodiment shown, is allowed to flow out the bottom of the cylinder through an appropriate orifice 35 where, as described below, it may be collected and pumped out of the case for analysis.

In order to obtain the separated bands of particles in the specific embodiment shown in FIG. 5, the following method has been used, although the invention is not limited to the particular method of collection herein discussed. The liquid ejected from the orifice 35 is collected in an annular dish 36 mounted within case 32. The walls of dish 36 are rinsed periodically with particle-free liquid from a separate source (not shown). The combined liquids are transferred from dish 36 to a conventional fraction collector 37 by an appropriate pumping system 38 so that liquid samples leaving the cylinder at different times are collected in different fractions, in a manner similar to that discussed with reference to FIG. 8. Bands of lighter particles arrive at the bottom of the cylinder 24 before bands of heavier particles, and are therefore collected in the earlier fractions. By suitable chemical techniques, the contents of the separate fractions can be examined, and the bands can be identified.

Figure 6:
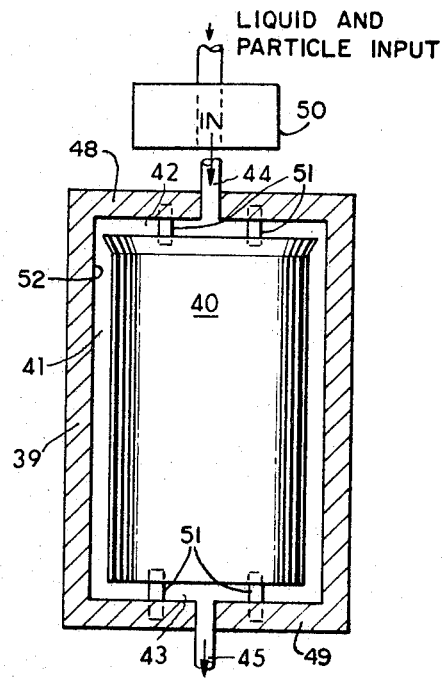
FIG. 6 shows a cross-sectional view of still another alternative embodiment of the invention for separating particles of relatively small effective masses.

Although the particular structure shown in FIG. 5 has been found to be useful, other alternative structures operating as centrifuge systems may also be devised by those in the art. For example, an alternative embodiment is shown in FIG. 6 wherein a first hollow cylinder 39 having an inner surface 52 encloses a second cylinder 40, the size of inner cylinder 40 being such as to provide relatively small clearance spaces 41, 42 and 43 (of the order of 2.0, 0.2 and 0.2 millimeters, for example) between the side walls and the end walls, respectively, of the two cylinders. The outer cylinder 39 is connected to the inner cylinder 40 by a small number of rigid connecting struts or pins 51 appropriately attached to each cylinder. The overall dual cylinder combination is suitably rotated by a rotating source as was the single cylinder structure shown in FIG. 5. The space between the cylinders is first filled with particle-free liquid. A liquid sample containing a mixture of particles to be separated is then introduced at input end 44 and the particles are allowed to settle within the medium near the upper portion of the space between the side walls of the cylinders in accordance with Boltzmann's distribution law, as discussed above. Next, pure liquid is added at a constant rate at input end 44. The liquid moves in a linear direction along inner surface 52 parallel to the axis of rotation of the cylinders and appropriate particle groups or bands are formed between the inner and outer cylinder walls. At output end 45 discrete portions or samples of emerging fluid can be collected, e.g., in a fraction collector, as described above, so that particles having one effective mass will be found in sample volumes which are separate from those sample volumes containing particles of other effective masses. Through appropriate known techniques, the separated particles can be properly identified and examined.

Figure 7:
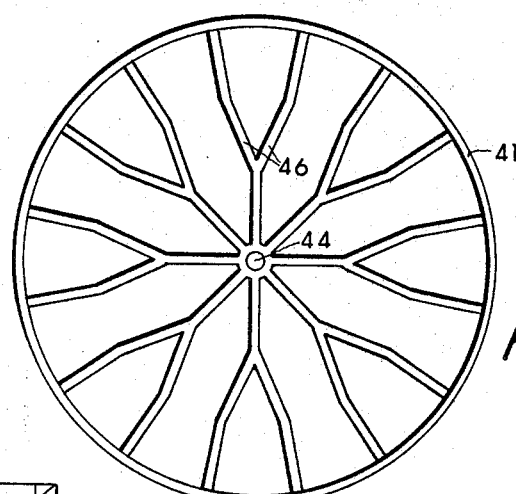
FIG. 7 shows a plan view of a portion of one end of the alternative embodiment of the invention shown in FIG. 6.

While the particular embodiment shown in FIG. 6 is depicted as being rotated about a vertical axis, it may also be set up to operate so as to rotate about a horizontal axis. In either case the cap structure 48 at the input end 44 may be constructed in the manner of FIG. 7 in which the liquid is introduced through an appropriate tube at input end 44 and travels through a network comprising a plurality of channels 46 to the space 41 between the inner and the outer cylinder walls. The use of a plurality of channels, such as shown in FIG. 7, insures that the liquid is uniformly distributed throughout the clearance space between the cylinder walls. The part of the cap structure between the channels serves to connect the outer cylinder 39 to the inner cylinder 40; additional connecting struts are not required.

The cap structure 49 at the output end 45 may be constructed in a similar fashion to that shown in FIG. 7. In this case it is essential that the total volume of the plurality of channels be sufficiently small that the average liquid velocity in the channels is large compared to the rate that particles settle in the liquid.

In any of the above discussed embodiments of the invention, it is necessary that the transverse acceleration applied to the flowing fluid medium be everywhere perpendicular to the surface of the medium at the bottom (at $h=0$). Otherwise, any slight local variation in the density of the fluid arising, for example, from the presence of the particles to be separated, would result in an unwanted flow under the action of the component of acceleration parallel to the surface. While this is easily assured in the embodiment of FIG. 1 so long as channel 10 remains in a horizontal position, a difficulty arises with respect to the embodiments shown in FIGS. 5 and 6. In these rotating devices the overall acceleration (i.e., the vector combination of the centrifugal acceleration due to rotation and the downward acceleration due to gravity) is not perpendicular to the surface of a cylinder, but rather to a surface of a paraboloid. The shape of this paraboloid depends on the rate of rotation, and at high rotation rates it is only approximately cylindrical. The inner surface 34 of cylinder 24 in FIG. 5, for example, must be shaped accordingly. Although it may be possible to machine the inner surface of the cylinder to the desired shape, two alternative methods appear to be preferable. In the first, a small sample of a suitable liquid resin (for example, an epoxy resin mixed with an appropriate hardening agent, or an aqueous buffer containing the components of a polyacrylamide gel) is introduced into the empty rotating cylinder at the input end. The resin spreads out on the inner cylinder wall until its free surface is precisely perpendicular to the overall acceleration, and then it sets to form a solid surface of the desired shape (for the particular rotation rate used). The resin may adhere strongly to the metal wall and become an intrinsic part of the cylinder. In the second method, a highly viscous yet plastic or deformable fluid is introduced into the rotating cylinder. The specific gravity of this fluid is greater than that of the liquid in which the particles are to be separated, and the two liquids are immiscible. (If the liquid containing the particles is an aqueous buffer, for example, the heavy fluid may be a halocarbon or a fluorocarbon oil.) The interface between the liquids, and hence the bottom of the liquid containing the particles, then has the desired paraboloid shape at all rates of rotation.

For the horizontally mounted embodiment discussed with reference to FIG. 6, no particular problem of this nature exists provided the inner surface of the outer cylinder is true, since the effect due to gravity (due to $g_0$) averages out in time. The two methods just described, however, may prove to be the best way to insure that such an inner surface is, in fact, true.

Other embodiments of the invention may occur to those skilled in the art within the scope of the invention, and the invention is not to be construed as limited to the specific embodiments shown and described herein except as defined by the appended claims.

What is claimed is:

1. A particle separator for separating particles in accordance with their effective masses comprising:
   a hollow container having a cylindrical inner wall;
   means for permitting the insertion of a liquid medium and said particles into one end of said container;
   means for rotating said container about the axis of said inner wall;
   cylindrical means attached to said container for directing said liquid medium when inserted toward said inner wall of said container, the amount of said liquid medium so inserted being sufficient to form a film of said liquid medium along said inner wall;
   means for retaining said film within said container under conditions of zero flow;
   said insertion permitting means further permitting the insertion of particles having different masses into said film, said rotation thereby subjecting said film to a transverse acceleration so that said particles are distributed in said film in accordance with their effective masses, in accordance with the magnitude of said transverse acceleration, and in accordance with the thickness and temperature of said film;
   said insertion permitting means further permitting the insertion of additional liquid medium into said container to cause said film to flow along said inner wall at a rate such that a non-turbulent variable velocity profile is established for said film in a direction transverse to the direction of said flow and parallel to the direction of said transverse acceleration, and such that the flow time $t_F$ is relatively long in comparison with the diffusion time $t_D$ of said particles in said film, particles having the same effective mass thereby flowing at substantially the same average velocity in said direction of flow and particles of different effective masses thereby flowing at different average velocities in said direction of flow, whereby separate groups of particles form within said film along said direction of flow, each of said groups containing particles of substantially the same effective mass.
   means for maintaining said velocity profile substantially constant in a direction transverse to the direction of said flow and parallel to said inner wall;
   means for removing said liquid medium from said container; and
   means for collecting separate portions of said liquid medium containing said different groups of particles.

2. A particle separator in accordance with claim 1 wherein the surface of said inner wall of said container comprises a material to which said particles will not be adsorbed.

3. A particle separator in accordance with claim 1 wherein
   said removing means includes at least one opening in said container for permitting said liquid medium to flow outwardly from said container;
   said collecting means includes fractional collection means for sequentially collecting separate portions of a liquid supplied thereto; and
   said removing means further includes means for directing said liquid medium from said container to said fractional collection means whereby separate portions of said liquid medium containing said different groups of particles are separately obtained.

4. A particle separator in accordance with claim 1 wherein said cylindrical means comprises
   a cylinder mounted within said container, the outer wall of said cylinder being concentric with said inner wall, so as to form a uniform annular clearance space between said inner wall and the outer surface of said cylinder;
   one end of said container and one end wall of said cylinder forming a first clearance space for conveying said liquid medium and said particles from said insertion permitting means to said annular clearance space;
   the other end of said container and the other end wall of said cylinder forming a second clearance space for conveying said liquid medium and said particles from said annular clearance space to said removing means, the total volume of said second clearance space being sufficiently small that the radial velocity of said liquid medium therein is large in comparison with the rate at which said particles settle in said liquid medium;
   means for interconnecting said cylinder and said container so that said container and said cylinder rotate as a unit; and
   wherein said insertion permitting means and said removing means are positioned along said axis.

5. A particle separator in accordance with claim 4 wherein said first and said second clearance spaces each comprise a plurality of channels.

6. A particle separator in accordance with claim 1 wherein the surface of said inner wall is paraboloidal.

7. A method of separating particles of different effective masses comprising the steps of:
   retaining a liquid medium in a state of zero flow;
   introducing said particles into said liquid medium;
   subjecting said liquid medium to a transverse acceleration and allowing said particles to diffuse within said liquid medium in accordance with their effective masses, in accordance with the magnitude of said transverse acceleration, and in accordance with the height and temperature of said medium;
   causing said liquid medium containing said particles to flow at a rate such that a non-turbulent variable velocity profile is established for said medium in a direction transverse to the direction of said flow and parallel to the direction of said transverse acceleration, and such that the flow time $t_F$ is relatively long in comparison with the diffusion time $t_D$ of said particles in said liquid medium, particles having the same effective mass thereby flowing at substantially the same average velocity in said direction of flow and particles having different effective masses thereby flowing at different average velocities in said direction of flow, whereby different groups of particles tend to form within said liquid medium at different locations along said direction of flow, each group containing particles of substantially the same effective mass;

maintaining said velocity profile substantially constant in a direction transverse to the direction of said flow and perpendicular to the direction of said transverse acceleration; and collecting separate portions of said medium containing said different groups of particles.

8. A method of separating particles of different effective masses in accordance with claim 7 wherein said liquid medium is caused to flow at a rate such that the relationship $\sqrt{t_D/t_F}$ is approximately equal to or less than $x/100$, where $x$ is the percentage difference in effective mass between two species of particles to be separated.

9. A method of separating particles of different effective masses in accordance with claim 7 wherein said liquid medium is subjected to a transverse acceleration which is due to gravity.

10. A method of separating particles of different effective masses in accordance with claim 7 wherein said liquid medium is subjected to a transverse acceleration which is primarily due to a centrifugal field.

11. A method of separating particles of different effective masses in accordance with claim 7 wherein said liquid medium is subjected to a transverse acceleration which is due to a centrifugal field and to gravity.

References Cited

UNITED STATES PATENTS

| 2,680,084 | 6/1954 | Ryan | 209—211 |
| 3,011,636 | 12/1961 | Dowsett | 209—156 |
| 3,038,326 | 6/1962 | De Ford | 73—23 |
| 3,449,938 | 6/1969 | Giddings | 73—23 |

FOREIGN PATENTS

| 480,213 | 7/1929 | Germany. |

FRANK W. LUTTER, Primary Examiner